(No Model.)
W. NEEDHAM.
HOG NOSE CUTTER.
No. 472,932. Patented Apr. 12, 1892.
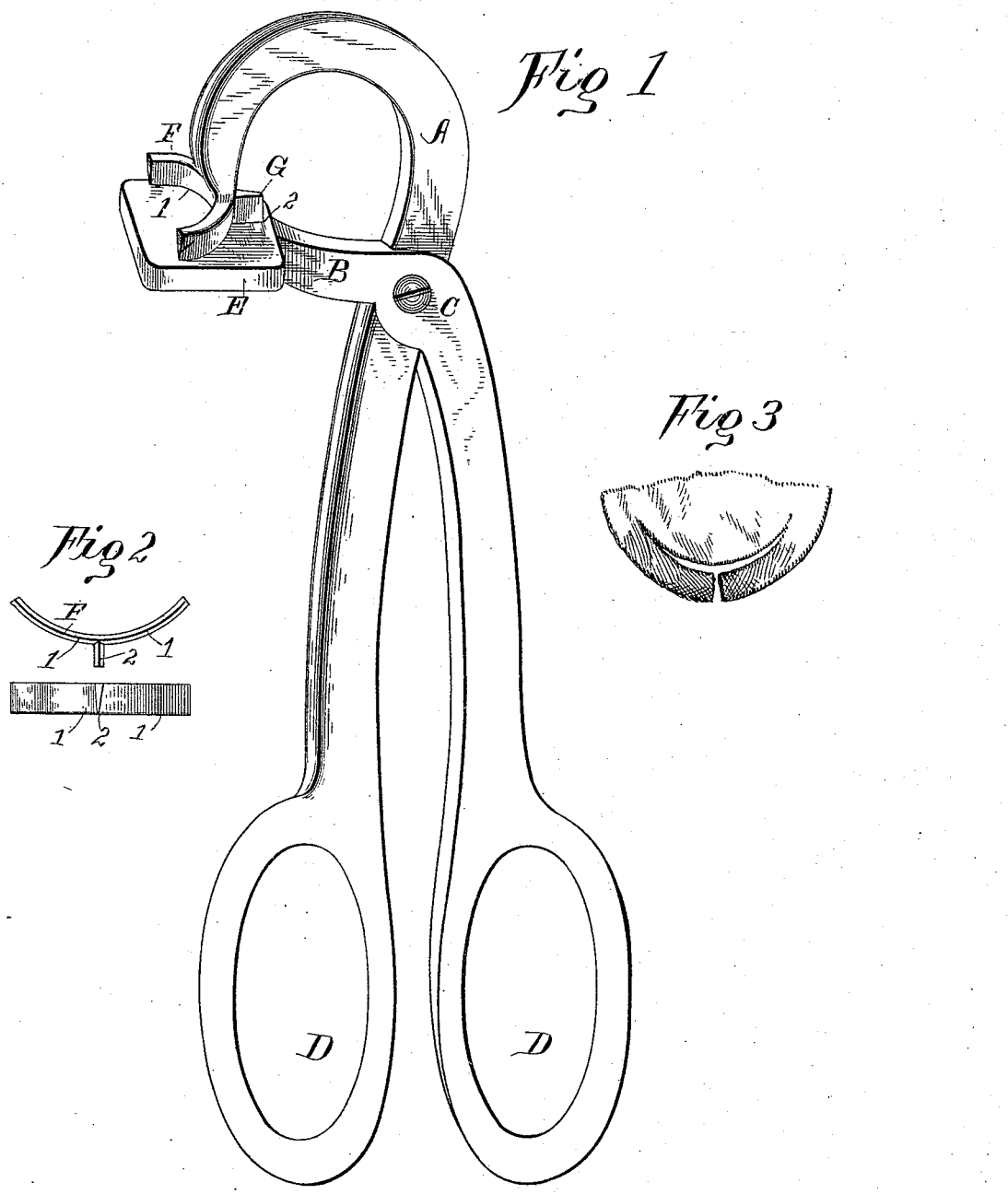

UNITED STATES PATENT OFFICE.

WILLIAM NEEDHAM, OF TAMPICO, ILLINOIS, ASSIGNOR OF ONE-HALF TO JOHN O. NEEDHAM, OF SAME PLACE.

HOG-NOSE CUTTER.

SPECIFICATION forming part of Letters Patent No. 472,932, dated April 12, 1892.

Application filed September 28, 1891. Serial No. 407,026. (No model.)

*To all whom it may concern:*

Be it known that I, WILLIAM NEEDHAM, a citizen of the United States, residing at Tampico, in the county of Whiteside and State of Illinois, have invented certain new and useful Improvements in Hog-Nose Cutters; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

My invention has reference to improvements in hog-nose cutters; and it consists of mechanism for cutting a curved slit across and in the end of the snout, and coincidently therewith a slit perpendicular to and about the center of the former one, extending through the portion of the snout partially severed by the first-named cut.

The purpose of my invention is to prevent hogs from rooting the sod or other soil when turned into pasture, stubble-fields, or orchards. I attain this result by the mechanism illustrated in the accompanying drawings, in which—

Figure 1 is a perspective view of a tool embodying my invention. Fig. 2 is a detail of the cutting-knives. Fig. 3 represents the appearance of the animal's nose after healing.

As my improvement consists, specifically, in the two cutting-blades adapted to coincidently operate and form intersecting gashes, and the body of the tool consists of parts which have been heretofore in use, I do not deem it necessary to describe the construction and operation of these.

Various devices have been heretofore employed for the purpose in view as a substitute for the practice of ringing, which is sometimes used. The main tool heretofore employed for severing the portion of the extremity of the snout of the animal cut a circular gash a short distance within the front edge of the snout transversely of the latter and curved substantially with the conformation of the snout. This gash had the effect, temporarily, of producing a partially-severed portion across the center of the forward extremity of the snout, which was attached at each end to the animal; but the gash thus created afterward healed and the former severed portion became integral with the other portion of the snout, when the animal would be as well enabled to root as before the operation. Another method was to cut through the center of the above partially-severed portion and allow the remainder of such severed portion to hang down from its two attached ends. The difficulty with this method was that these remaining ends of the severed portion were so short that after the sloughing off consequent upon healing the remaining stub ends of said partially-severed portions did not affect, practically, the ability of the animal to root, as the portion of the snout along the inner wall of said gash became as hard and tough as the extremity originally was.

In my invention, in addition to the cross curved cut of the first system named, I coincidently divide the partially-detached extremity by a clean vertical cut at the center thereof, and the ends thus formed hang downward and outward in front sufficiently to prevent the above-named healing of the cross-gash, and at the same time they are of such length that after their cut ends are healed they project inward in the way of the use of the front end of the snout in rooting, and thereby prevent the animal from forcing its snout into the earth.

The gist of my invention is the provision, upon suitable handles, of a cutting-blade of the curved form cutting the aforesaid curved transverse gash slightly within the forward extremity of the snout and a vertical supplementary cutting-blade at a right angle to the first-named blade and projecting from the convex side thereof. This duplex blade, being seated upon one of the jaws of the ordinary pinchers and adapted to be forced in the usual mode against a suitable block seated oppositely on the other jaw of the pinchers, simultaneously cuts both of said gashes.

A is one of the jaws of the pinchers generally employed for this business, and B the other one, which are mutually pivoted at C and respectively provided with handles D and hand-holes D' D' at their other extremities.

The jaw B is turned nearly at right angles from its pivotal point N and provided on its upper turned surface with a resisting cutting-block E. The jaw A is curved over from its pivotal point C toward and above the block E, so that its extremity is suspended above said block. To the suspended end of the jaw A there is rigidly affixed in any suitable mode the laterally-curved knife F, having a cutting-edge 1 throughout its lower surface of sufficient length to cut a curved gash in the snout of the animal any desired distance inside of the extremity of said snout substantially parallel with the front edge of the snout, but not long enough to cut through the edge of the snout at either end of said knife.

G is the supplementary knife, which is placed at right angles to the center of the knife F, perpendicular to and projecting inwardly therefrom, and has its lower cutting-edge 2 on the same horizontal plane with the cutting-edge of the knife F, and is shown as formed integral with the latter knife.

The operation of my invention is as follows: The snout of the animal, resting upon the block E, with the forward extremity of the snout extending toward the pivotal point of said jaw, is seized between the opposing ends of the jaws A and B. By forcing the handles of the jaws A and B together the knives F and G are coincidently brought down with great force upon the block E, thereby cutting a clean gash of a curved form entirely through the snout of the animal a slight distance within the forward edge of the latter and at the same time a clean gash perpendicular to the former and about the center thereof through the partially-severed forward extremity of the snout. When the pinchers are released, the two halves of the partially-severed extremities of the snout will thereafter hang down on the nose of the animal, interposing between the nose and the ground in any attempted rooting.

What I claim as my invention, and desire to secure by Letters Patent of the United States, is—

A hog-nose cutter comprising the pivoted handles D, formed with the jaws A and B, the former provided with a curved blade F and a straight blade G, the latter blade situated at a right angle to the former upon the convex side, about centrally thereof and integral therewith, and the jaw B provided with a cutting-block E, as set forth.

In witness whereof I affix my name in the presence of two witnesses.

WILLIAM NEEDHAM.

Witnesses:
JOHN O. NEEDHAM,
JNO. G. MANAHAN.